Aug. 2, 1949.  E. J. BRUINGTON  2,478,085
TROLLING SPOON
Filed April 15, 1946
Fig. 1.  Fig. 2.
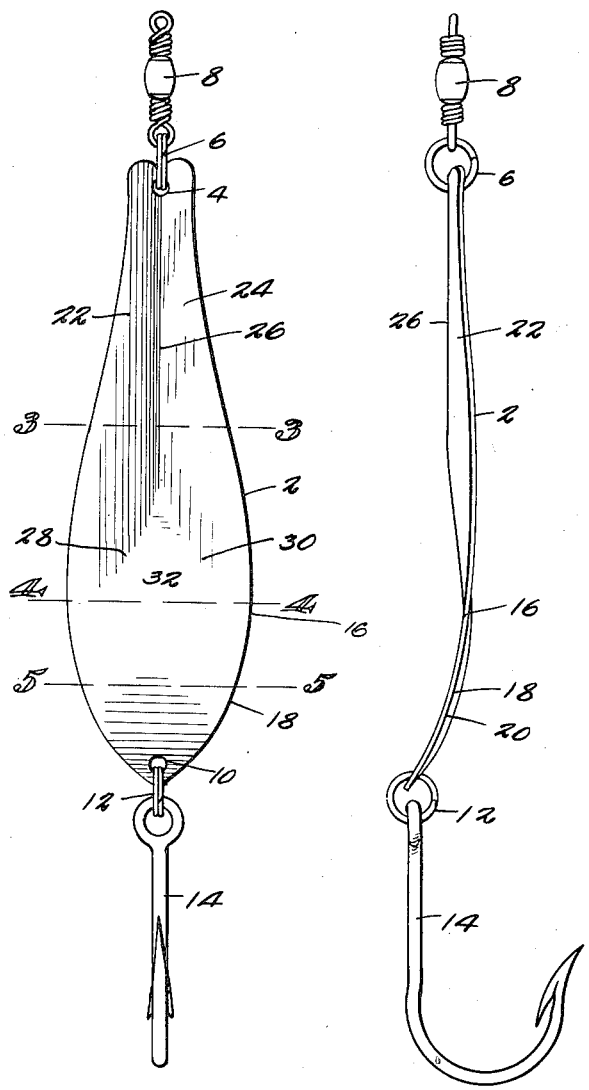
Fig. 3.
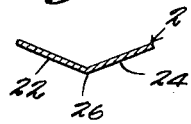
Fig. 4.
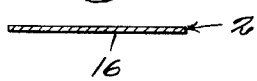
Fig. 5
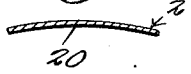
E. J. Bruington
INVENTOR.
BY
ATTORNEYS.

Patented Aug. 2, 1949

2,478,085

UNITED STATES PATENT OFFICE 2,478,085

TROLLING SPOON

Eldon J. Bruington, Onamia, Minn.

Application April 15, 1946, Serial No. 662,310

1 Claim. (Cl. 43—42.5)

My present invention relates to an improved trolling spoon of the type designed to be attached to a trolling line and so formed as to effect multiple light reflections and at the same time effect distinct motions to the spoon when in motion.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a plan view of the spoon of my invention.

Figure 2 is a side elevational view thereof.

Figure 3 is a sectional view at line 3—3 of Figure 1.

Figure 4 is a sectional view at line 4—4 of Figure 1.

Figure 5 is a sectional view at line 5—5 of Figure 1.

Referring now to the drawings in detail I have illustrated the trolling spoon of my invention having a body 2 preferably of a metal capable of taking a high polish and being resistant to rust from contact with water.

A hole 4 is provided in the body 2 for the reception of a ring 6 to which is secured the line swivel 8, while a hole 10 at the opposite end of the spoon is provided for a ring 12 to which I have secured a hook 14.

The spoon body is shown with a substantially flat portion 16 near one end of the spoon, the flat portion in width extending fully across the spoon. In length, that is, distance taken up by the flat portion lengthwise of the spoon, the flat portion extends only a very short distance. The body between the flat portion and the near end is curved downwardly from the flat portion as at 18 and this curved portion is also bent laterally downward toward the edges of the spoon as at 20 and terminates in a point near the hole 10.

The longer portion of the body between the plane portion 16 and the forward end of the spoon is fashioned with sections 22 and 24 bent from the longitudinal center line 26 of the spoon so that said longer or forward portion of the spoon is V-shaped in cross section as shown in Figure 3. Between the rear terminus of the center line 26 and the plane portion 16 the angular sections merge forming divergent diminishing ridges 28 and 30 with a triangular plane portion therebetween indicated as at 32.

When pulled through the water as in trolling, the angular sections 22 and 24 will reflect light rays therefrom, the plane portion 16 will reflect light rays in a different direction and the curved, cupped end 18 will reflect light rays in various directions.

When the spoon is trolled and moved forwardly through the water the angular sections will effect a side to side motion and this motion will become wiggling motion when bait is pulled with the hook and when the spoon is moved or pulled quickly through the water.

Thus both motion and various light reflections will result from the trolling motion, and the spoon will attract fish thereto whereupon the fish will be impaled upon the hook.

Having thus fully described my invention, what I claim as new and desire to secure by Letters Patent is:

A trolling spoon comprising a body of metal material having greater length than width, one end portion being convex in longitudinal and transverse cross-section, a second portion of substantially triangular shape having one of its sides substantially straight and constituting one of the ends of the convex portion and a third portion of greater length than the combined first and second portions, one end of the third portion having as its boundaries the two other sides of the triangular portion, said last named sides converging and meeting in a line constituting the bottom of the third portion, said third portion being V-shaped in cross section in that portion of its length exclusive of its boundaries adjacent of the triangular portion, the end of the third portion opposite the triangular portion having the narrowest width of any part of the third portion of said body.

ELDON J. BRUINGTON.

REFERENCES CITED

The following references are of record in the file of this patent:

UNITED STATES PATENTS

| Number | Name | Date |
|---|---|---|
| 1,871,377 | Khoenle | Aug. 9, 1932 |